United States Patent
Yang et al.

(10) Patent No.: US 9,604,154 B2
(45) Date of Patent: Mar. 28, 2017

(54) SEPARATION AND RECOVERY DEVICE FOR LIQUID WASTE INCLUDING RADIONUCLIDE, AND SEPARATION AND RECOVERY METHOD USING THE SAME

(71) Applicant: Korea Atomic Energy Research Institute, Daejeon (KR)

(72) Inventors: Hee-Chul Yang, Daejeon (KR); Dong Yong Chung, Daejeon (KR); Jeikwon Moon, Daejeon (KR)

(73) Assignee: Korea Atomic Energy Research Institute, Daejeon (KR)

( * ) Notice: Subject to any disclaimer, the term of this patent is extended or adjusted under 35 U.S.C. 154(b) by 821 days.

(21) Appl. No.: 14/077,001

(22) Filed: Nov. 11, 2013

(65) Prior Publication Data

US 2014/0151215 A1    Jun. 5, 2014

(30) Foreign Application Priority Data

Nov. 30, 2012    (KR) .................. 10-2012-0137903

(51) Int. Cl.
*B01D 5/00*    (2006.01)

(52) U.S. Cl.
CPC ............. *B01D 5/009* (2013.01); *B01D 5/006* (2013.01)

(58) Field of Classification Search
CPC . B01D 5/006; B01D 3/16; B01D 3/18; B01D 3/20; B01D 3/205
See application file for complete search history.

(56) References Cited

U.S. PATENT DOCUMENTS

| | | | |
|---|---|---|---|
| 5,980,695 A * | 11/1999 | Cox | ................ B01D 3/42 202/166 |
| 2008/0035467 A1* | 2/2008 | Torii | ................ B01D 1/0047 203/49 |

FOREIGN PATENT DOCUMENTS

| | | | |
|---|---|---|---|
| JP | 06160592 | 6/1994 | |
| JP | 10206594 | 8/1998 | |
| JP | 11-244602 | 9/1999 | |
| KR | 1020050109290 A | 11/2005 | |
| KR | 100675941 | 1/2007 | |
| KR | 100928652 B | 11/2009 | |
| KR | 1020100121937 B | 11/2010 | |
| KR | 101008491 | 1/2011 | |
| KR | 101189173 B | 10/2012 | |
| KR | 20140069972 | 6/2014 | |
| WO | WO 2007088011 A1 * | 8/2007 | ............. B01D 3/085 |

OTHER PUBLICATIONS

Becker et al. Machine Language Translation of WO 2007/088011 A1. Obtained by the examiner from <google.com/patents> on Jun. 17, 2016.*

(Continued)

*Primary Examiner* — Christopher A Hixson
(74) *Attorney, Agent, or Firm* — Workman Nydegger

(57) ABSTRACT

Provided are a separation and recovery device for a liquid waste including a radionuclide, and a separation and recovery method using the same. Specifically, the present disclosure relates to a separation and recovery device that may effectively separate a liquid waste, such as a waste detergent including a radionuclide, and simultaneously, may prevent the release of tritium and radiocarbon to the outside, and a separation and recovery method using the same.

15 Claims, 2 Drawing Sheets

(56) References Cited

OTHER PUBLICATIONS

IAEA. "Treatment and conditioning of radioactive organic liquids." Jul. 1992. IAEA-TECDOC-656. ISSN 1011-4289. Austria.*
Smolkova-Keulemansova, E. et al. "Analysis of Substances in the Gaseous Phase, 1st Edition." Elsevier Science. 1991. p. 213.*
Velasco-Arjona, A. et al. "Fully robotic method for the determination of diene value in several types of fuels." The Analyst (1998) 123 1867-1869.*
Elder, Ronald. "Cocktails for liquid scintillation counting." PerkinElmer Product Note. 2015.*
Rahman, R.O. Abdel et al., "Liquid Radioactive Wastes Treatment: A Review", Water 2011, May 12, 2011, vol. 3, ISSN 2073-4441, pp. 551-565, MDPI, Basel, Switzerland.
Birgenheier, D.B., et al., "Design of Vacuum Systems for Crude Oil Vacuum Tower Distillation", Hydorcarbon Processing Symposium, 1988.

* cited by examiner

SEPARATION AND RECOVERY DEVICE FOR LIQUID WASTE INCLUDING RADIONUCLIDE, AND SEPARATION AND RECOVERY METHOD USING THE SAME

CROSS-REFERENCE TO RELATED APPLICATIONS

This patent application claims the benefit of and priority to Korean Patent Application No. 10-2012-0137903, filed on Nov. 30, 2012, the contents of which are incorporated herein by reference in their entireties.

BACKGROUND OF THE INVENTION

1. The Field of the Invention

The present disclosure relates to a separation and recovery device for a liquid waste including a radionuclide, and a separation and recovery method using the same.

2. Description of the Related Art

Various organic or inorganic detergents are used for decontamination or cleaning of contaminated equipment in nuclear facilities, and in this case, waste oil remaining in the equipment is discharged in a state of being mixed with the detergents during the cleaning. Also, with respect to a treatment of an organic-inorganic mixed liquid waste including a portion of an inorganic liquid waste as well as a liquid waste, such as the waste detergent including waste oil, a method was disclosed in Korean Patent Nos. 10-0928652 and 10-0675941, in which contaminants in the liquid waste are precipitated using a precipitant, the contaminants are removed by a separation method, such as centrifugation or a filtration device, and an organic liquid and an inorganic liquid are then separated by a typical vacuum distillation method.

In addition, a method of combustion of an organic liquid and an inorganic liquid was disclosed in Korean Patent Application Laid-Open Publication No. 10-2005-0109290.

In the case that the organic-inorganic mixed liquid waste is treated by the typical method as described above, sufficient precipitation reaction efficiency may be obtained only in the case in which an excessive amount of chemicals, such as a precipitant, is introduced into the entire organic-inorganic mixed liquid waste. Since more than a certain amount of the precipitant may be mixed in the organic-inorganic mixed liquid waste remaining after the removal of the precipitant, the complete separation of an organic component and an inorganic component may not be facilitated. Also, since the excessive amount of the used precipitant may be included in each or any one of the organic component and the inorganic component even after the organic component and the inorganic component have been separated, the separated components may not be recycled or may not be efficiently processed and disposed.

A large amount of a beta radionuclide, such as tritium (H-3) or radiocarbon (C-14), is dissolved in the waste detergent including waste oil that is generated in nuclear facilities. In this case, the tritium in the form of tritiated water ($^3H_2O$) and the radiocarbon in the form of $^{14}CO_2$, $^{14}CH_4$, and $^{14}C_2H_6$ are dissolved in the mixed liquid waste, and even in the case in which a typical distillation/condensation process is performed, a portion of the tritium and the radiocarbon may be released to the outside with exhaust gas. Therefore, a separate collection device for preventing this may be installed or the exhaust gas may be processed by providing the exhaust gas to a separate exhaust gas treatment system.

Accordingly, during research into a process for effectively treating the waste detergent having a large amount of a beta radionuclide, such as tritium (H-3) or radiocarbon (C-14), dissolved therein as well as separating waste oil and detergent from the waste detergent including waste oil that is generated during the decontamination or disassembling of equipment in nuclear facilities, the present inventors developed a separation device that may effectively separate the waste detergent and simultaneously, may prevent the release of the tritium and the radiocarbon to the outside, thereby leading to completion of the present invention.

BRIEF SUMMARY OF THE INVENTION

One object of the present invention is to provide a separation and recovery device for a liquid waste including a radionuclide, and a separation and recovery method using the same.

In order to achieve the object, the present invention provides a separation and recovery device for a liquid waste including a radionuclide, including: a liquid waste storage unit that stores a liquid waste mixture including a radionuclide; a heating unit that heats the liquid waste storage unit to evaporate a low boiling point liquid waste including a radionuclide from the liquid waste mixture in the liquid waste storage unit; a condensation chamber that is connected to an upper portion of the heating unit and condensates the liquid waste evaporated by heating by the heating unit; a condensate recovery unit that is connected to the condensation chamber and recovers a condensate condensed in the condensation chamber; and a transfer tube that transfers the condensate condensed in the condensation chamber to the condensate recovery unit, in which one end of the transfer tube is dipped in the condensate in the condensate recovery unit, wherein the evaporated low boiling point liquid waste moves from the heating unit to the condensate recovery unit by a pressure difference between the heating unit and the condensate recovery unit, and the radionuclide evaporated by the heating unit is recovered by being dissolved in the condensate that is recovered in the condensate recovery unit.

The present invention also provides a method of separating and recovering a liquid waste including a radionuclide by using the separation and recovery device, including: heating a liquid waste mixture including a radionuclide to evaporate a low boiling point liquid waste including the radionuclide (step 1); condensing the low boiling point liquid waste evaporated in step 1 and then recovering a condensate to a condensate recovery unit (step 2); and dipping one end of a transfer tube in the condensate recovered in step 2 to dissolve the evaporated radionuclide in the condensate in the condensate recovery unit (step 3).

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Features and advantages of the present invention will be more clearly understood by the following detailed description of the present preferred embodiments by reference to the accompanying drawings. It is first noted that terms or words used herein should be construed as meanings or concepts corresponding with the technical spirit of the present invention, based on the principle that the inventor can appropriately define the concepts of the terms to best describe his own invention. Also, it should be understood that detailed descriptions of well-known functions and structures related to the present invention will be omitted so as not to unnecessarily obscure the important point of the present invention.

The present invention provides a separation and recovery device for a liquid waste including a radionuclide, the separation and recovery device including:

a liquid waste storage unit that stores a liquid waste mixture including a radionuclide;

a heating unit that heats the liquid waste storage unit to evaporate a low boiling point liquid waste including a radionuclide from the liquid waste mixture in the liquid waste storage unit;

a condensation chamber that is connected to an upper portion of the heating unit and condensates the liquid waste evaporated by heating by the heating unit;

a condensate recovery unit that is connected to the condensation chamber and recovers a condensate condensed in the condensation chamber; and a transfer tube that transfers the condensate condensed in the condensation chamber to the condensate recovery unit, in which one end of the transfer tube is dipped in the condensate in the condensate recovery unit, wherein the evaporated low boiling point liquid waste moves from the heating unit to the condensate recovery unit by a pressure difference between the heating unit and the condensate recovery unit, and the radionuclide evaporated by the heating unit is recovered by being dissolved in the condensate that is recovered in the condensate recovery unit.

Figure 1:
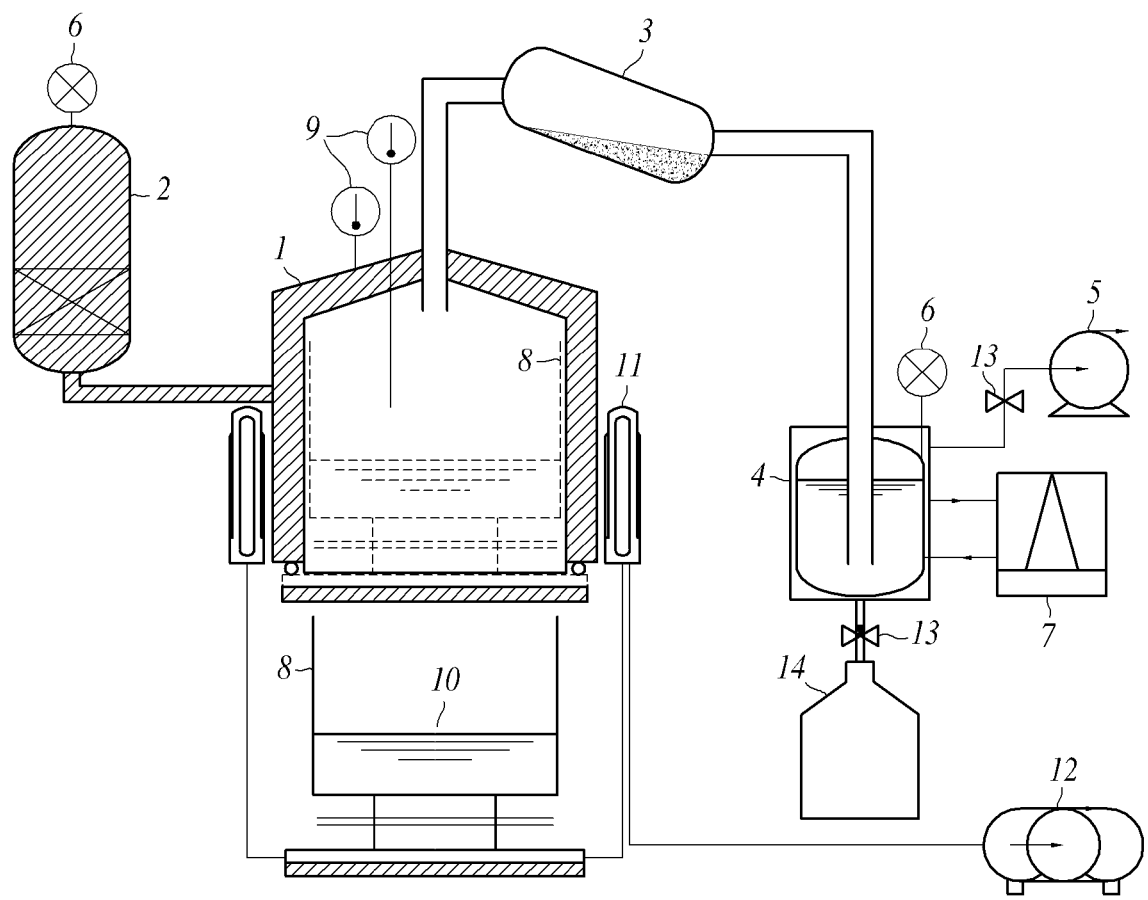
FIG. 1 is a schematic view illustrating a separation and recovery device according to the present invention.

An embodiment of the separation and recovery device according to the present invention is schematically illustrated in FIG. 1, and hereinafter, the separation and recovery device according to the present invention will be described in detail with reference to the attached drawings.

Referring to FIG. 1, the separation and recovery device according to the present invention includes a liquid waste storage unit 8 that stores a liquid waste mixture 10 including a radionuclide, and a heating unit 1 that heats the liquid waste storage unit 8 to evaporate a low boiling point liquid waste including a radionuclide from the liquid waste mixture 10 in the liquid waste storage unit 8. Also, the separation and recovery device according to the present invention includes a condensation chamber 3 that is connected to an upper portion of the heating unit 1, the low boiling point liquid waste including a radionuclide is evaporated as the liquid waste storage unit 8 is heated by the heating unit 1, and the evaporated liquid waste is condensed by being transferred to the condensation chamber 3. Furthermore, the separation and recovery device according to the present invention includes a condensate recovery unit 4, in which a condensate condensed in the condensation chamber 3 is transferred and recovered, and the condensates transferred from the condensation chamber 3 are recovered and separated in the condensate recovery unit 4.

The separation and recovery device according to the present invention includes a transfer tube that transfers the condensate condensed in the condensation chamber 3 to the condensate recovery unit 4, wherein one end of the transfer tube is dipped in the condensate in the condensate recovery unit 4.

The low boiling point liquid waste including a radionuclide is evaporated as the liquid waste storage unit 8 is heated by the heating unit 1 and is condensed in the condensation chamber 3. However, the radionuclide is not condensed in the condensation chamber 3 and exists as a gas phase. In this case, the radionuclide existing as a gas phase may be separated and condensed by being dissolved in the condensate, which is transferred from the condensation chamber 3, in the condensate recovery unit 4. For this purpose, the one end of the transfer tube is dipped in the condensate in the condensate recovery unit 4 so that the radionuclide released from the transfer tube is allowed to be dissolved in the condensate while the radionuclide is bubbling by being in contact with the condensate at a lower portion of the condensate recovery unit 4.

In the separation and recovery device according to the present invention, a pressure in the heating unit 1 becomes greater than a pressure of the condensate recovery unit 4 as the liquid waste storage unit 8 is heated by the heating unit 1, and as a result, the evaporated low boiling point liquid waste moves to the condensation chamber 3.

That is, the evaporated low boiling point liquid waste moves from the heating unit 1 to the condensate recovery unit 4 by a pressure difference between the heating unit 1 and the condensate recovery unit 4. The evaporated liquid waste transferred to the condensation chamber 3 is condensed during a moving process while the temperature of the gas decreases in a moving path, and thus, the evaporated liquid waste is generated as the condensate in the condensation chamber 3.

A transport phenomenon of the evaporated liquid waste may be performed in such a manner that droplets formed in an upper portion of the condensation chamber 3 are settled while moving to the right, a condensate is continuously accumulated in a lower portion thereof, and the condensed condensate is continuously transferred to the condensate recovery unit 4. In addition, the transport phenomenon of the evaporated liquid waste continues until the low boiling point liquid waste is entirely evaporated from the liquid waste mixture 10.

The liquid waste mixture 10 may be a waste detergent including waste oil or wastewater including a fluorescent liquid waste. That is, as described above, various organic or inorganic detergents are used for the decontamination or cleaning of contaminated equipment in nuclear facilities, and in this case, waste oil remaining in the equipment may be discharged in a state of being mixed with the detergent during the cleaning.

In addition, the fluorescent liquid waste, for example, urines from workers working in the nuclear facilities, may be released in a state of being mixed with water.

A large amount of a beta radionuclide, such as tritium (H-3) or radiocarbon (C-14), is dissolved in the waste detergent including waste oil or the wastewater including a fluorescent liquid waste that is discharged from the nuclear facilities. In this case, the tritium in the form of tritiated water ($^{3}H_2O$) and the radiocarbon in the form of $^{14}CO_2$, $^{14}CH_4$, and $^{14}C_2H_6$ are dissolved in the mixed liquid waste, and even in the case in which a typical distillation/condensation process is performed, a portion of the tritium and the radiocarbon may be released to the outside with exhaust gas. Therefore, a separate collection device for preventing this may be installed or the exhaust gas may be processed by providing the exhaust gas to a separate exhaust gas treatment system.

In contrast, the separation and recovery device according to the present invention heats the liquid waste mixture 10, such as the waste detergent including waste oil or the wastewater including a fluorescent liquid waste, by the heating unit 1, wherein only the waste detergent or the wastewater having a relatively low boiling point is evaporated with the radionuclide and the evaporated radionuclide is dissolved in the condensate recovered in the condensate recovery unit 4. Thus, limitations in a typical treatment technique may be addressed, in which a separate collection device is installed or a separate treatment system is required.

The separation and recovery device according to the present invention may further include a vacuum pump 5 that is linked with the condensate recovery unit 4. The vacuum pump 5 is for decompressing the inside of the condensate recovery unit 4, wherein the pressure difference between the heating unit 1 and the condensate recovery unit 4 may be further applied by the vacuum pump 5 and the transport phenomenon of the evaporated liquid waste may be further promoted as the pressure difference is further increased.

Also, the separation and recovery device according to the present invention may include the liquid waste storage unit 8 and the heating unit 1 that are allowed to be spaced apart from each other, and in this case, the separation and recovery device according to the present invention may further include a transfer device that may transfer the liquid waste storage unit 8 to the heating unit 1.

The transfer device, for example, may be composed of a liquid waste storage unit transfer cylinder 11 and an air compressor 12 as illustrate in FIG. 1, and the waste storage unit 8 may be transferred to the heating unit 1 by driving the cylinder 11 through the air compressor 12.

However, the transfer device is not limited to the transfer cylinder 11 and the air compressor 12 as illustrate in FIG. 1, and a transfer means suitable for transferring the liquid waste storage unit 8 may be appropriately selected and used.

In the separation and recovery device according to the present invention, the heating unit 1 may be included in the form of surrounding the liquid waste storage unit 8, and in particular, the heating unit 1 may indirectly heat the liquid waste storage unit 8 by using heat medium oil.

Since the indirect heating of the liquid waste storage unit 8 by using the heat medium oil may precisely control a temperature and may perform indirect heating, there may be no risk of fire due to overheating. Therefore, the separation and recovery device according to the present invention may more easily and safely perform the separation of the liquid waste mixture by using differences in boiling point.

That is, for example, in the case that the liquid waste mixture is a waste detergent including waste oil, only the waste detergent having a relatively low boiling point must be evaporated by the heating unit 1. However, in the case in which the waste oil having a high boiling point is evaporated with the waste detergent, since the waste oil and the waste detergent may not be separated, the precise control of the heating temperature may be required to evaporate only the waste detergent having a low boiling point.

Accordingly, the heating unit 1 indirectly heats the liquid waste storage unit 8 by using heat medium oil so that the temperature is precisely controlled to allow the liquid waste having a high boiling point to be absolutely not evaporated but only the liquid waste having a low boiling point to be evaporated. As a result, only the liquid waste having a low boiling point may be effectively separated.

Since the heating unit 1 heats the liquid waste storage unit 8 by using the heat medium oil, the separation and recovery device according to the present invention may further include a heat medium oil storage unit 2 and a pressure gauge 6 that is included in the heat medium oil storage unit 2. As a result, the heat medium oil may be appropriately provided to the heating unit 1 to heat the liquid waste storage unit 8.

As described above, the heating unit 1 may heat the liquid waste storage unit 8 through the precise temperature control. Accordingly, the separation and recovery device according to the present invention includes thermocouples 9 that may respectively measure temperatures of the heating unit 1 and the liquid waste storage unit 8. Since the thermocouples 9 are included, the temperatures of the heating unit 1 and the liquid waste storage unit 8 may be measured in real time. As a result, the liquid waste may be heated by the precise control of the temperature to allow the liquid waste having a high boiling point to be absolutely not evaporated, but only the liquid waste having a low boiling point to be evaporated.

The separation and recovery device according to the present invention may further include a chiller 7 that may cool the condensate recovery unit 4. With respect to the radiocarbon, a type of radionuclides, the radiocarbon exists in the form of $^{14}CO_2$, $^{14}CH_4$, and $^{14}C_2H_6$, and as illustrated in solubility graphs of FIG. 2, it may be understood that the solubility further increases as the temperature decreases. That is, since the separation and recovery device according to the present invention further includes the chiller 7, the temperature of the condensate recovery unit 4 may be further decreased. As a result, the radionuclide, such as radiocarbon, may be further dissolved in the condensate.

In this case, the chiller 7 may indirectly cool the condensate recovery unit 4 by using a refrigerant. That is, the chiller 7 may decrease the temperature of the inside of the condensate recovery unit 4 by cooling an outer surface of the condensate recovery unit 4 using the refrigerant. However, the chiller 7 is not limited thereto, and an appropriate means, which may reduce the temperature of the inside of the condensate recovery unit 4, may be used as the chiller 7.

In the separation and recovery device according to the present invention, the condensation chamber 3 may be a transparent container, in which the inside thereof is visible from the outside. Since the condensation chamber 3 is transparent, the condensation and transport phenomena of the evaporated liquid waste may be visually observed from the outside. As a result, the time of completion of the condensation and transport phenomena may be accurately identified.

That is, since the condensation chamber 3 is a transparent container, the transfer of the condensate to the condensate recovery unit 4 may be visually observed. Simultaneously, it may be observed that vapor phase condensation in the form of fog occurs in an upper portion of the condensate in the condensation chamber 3, and it may be understood that the transfer of the low boiling point liquid waste is terminated when the two phenomena are stopped.

In addition, the condensation chamber 3 may have an inclined form so that the condensate may be transferred to the condensate recovery unit 4 when more than a predetermined amount of the evaporated liquid waste is condensed. That is, as illustrated in FIG. 1, when the condensation chamber 3 has the inclined form, the condensate may be continuously transferred to the condensate recovery unit 4 after more than a predetermined amount of the condensate is accumulated.

As described above, the separation and recovery device for a liquid waste including a radionuclide according to the present invention may heat the liquid waste mixture including a radionuclide, such as tritium or radiocarbon, wherein the liquid waste mixture is heated to a temperature at which only the liquid waste having a low boiling point is evaporated. As a result, the liquid waste mixture may be efficiently separated. Also, since the liquid waste mixture is separated and simultaneously, the radionuclide included in the liquid waste mixture may be recovered by being dissolved in the condensate, the release of the radionuclide to the external environment may be prevented without a separate collection device or a separate treatment system.

In addition, since almost no radionuclide is included in the remaining liquid waste that is not evaporated, the remaining liquid waste may be recycled or may be treated as a non-radioactive waste. Furthermore, since oil is not included in the condensate having most of the radionuclide enriched therein, the condensate may be easily processed even in a wastewater treatment system of a nuclear power plant, in which wastewater including oil may not be processed.

The present invention provides a method of separating and recovering a liquid waste including a radionuclide by using the separation and recovery device, the method including:

heating a liquid waste mixture including a radionuclide to evaporate a low boiling point liquid waste including the radionuclide (step 1);

condensing the low boiling point liquid waste evaporated in step 1 and then recovering a condensate to a condensate recovery unit (step 2); and dipping one end of a transfer tube in the condensate recovered in step 2 to dissolve the evaporated radionuclide in the condensate in the condensate recovery unit (step 3).

Hereinafter, the separation and recovery method according to the present invention will be described in detail for each step.

In the separation and recovery method according to the present invention, step 1 is heating a liquid waste mixture including a radionuclide to evaporate a low boiling point liquid waste including the radionuclide.

The liquid waste mixture in step 1 is a mixture, in which a low boiling point liquid waste and a high boiling point liquid waste are mixed. The liquid waste mixture is heated to an appropriate temperature and thus, the liquid waste mixture may be separated by evaporating the low boiling point liquid waste using differences in boiling points of the liquid wastes.

In this case, the liquid waste mixture may be a waste detergent including waste oil or wastewater including a fluorescent liquid waste. As described above, various organic or inorganic detergents are used for the decontamination or cleaning of contaminated equipment in nuclear facilities, and in this case, waste oil remaining in the equipment may be discharged in a state of being mixed with the detergent during the cleaning.

In addition, the fluorescent liquid waste, for example, urines from workers working in the nuclear facilities, may be released in a state of being mixed with water.

A large amount of a beta radionuclide, such as tritium (H-3) or radiocarbon (C-14), is dissolved in the waste detergent including waste oil or the wastewater including a fluorescent liquid waste that is discharged from the nuclear facilities. In this case, the tritium in the form of tritiated water ($^3H_2O$) and the radiocarbon in the form of $^{14}CO_2$, $^{14}CH_4$, and $^{14}C_2H_6$ are dissolved in the mixed liquid waste, and even in the case in which a typical distillation/condensation process is performed, a portion of the tritium and the radiocarbon may be released to the outside with exhaust gas. Therefore, a separate collection device for preventing this may be installed or the exhaust gas may be processed by providing the exhaust gas to a separate exhaust gas treatment system.

Accordingly, in step 1, the liquid waste mixture, such as the waste detergent including waste oil or the wastewater including a fluorescent liquid waste, is heated, wherein the heating is precisely performed at a temperature that allows only the waste detergent or the wastewater having a relatively low boiling point to be evaporated with the radionuclide. As a result, the high boiling point liquid waste is not evaporated, but only the low boiling point liquid waste is evaporated.

In the separation and recovery method according to the present invention, step 2 is condensing the low boiling point liquid waste evaporated in step 1 and then recovering a condensate to a condensate recovery unit.

The low boiling point liquid waste evaporated in step 1 moves to the condensation chamber and a condensate is generated in the condensation chamber as the condensation is performed during the movement of the evaporated liquid waste. The condensate generated in the condensation chamber is transferred to the condensate recovery unit through a transfer tube and recovered.

In the separation and recovery method according to the present invention, step 3 is dipping one end of the transfer tube in the condensate recovered in step 2 to dissolve the evaporated radionuclide in the condensate in the condensate recovery unit.

With respect to a radionuclide, for example, radiocarbon, the radiocarbon exists in the form of $^{14}CO_2$, $^{14}CH_4$, and $^{14}C_2H_6$, and may be easily dissolved in the condensate of step 2. Therefore, in step 3, the one end of the transfer tube is dipped in the recovered condensate and the radionuclide transferred from the transfer tube is dissolved in the condensate while the radionuclide is bubbling by being in contact with the condensate at a lower portion of the condensate recovery unit.

Figure 2:
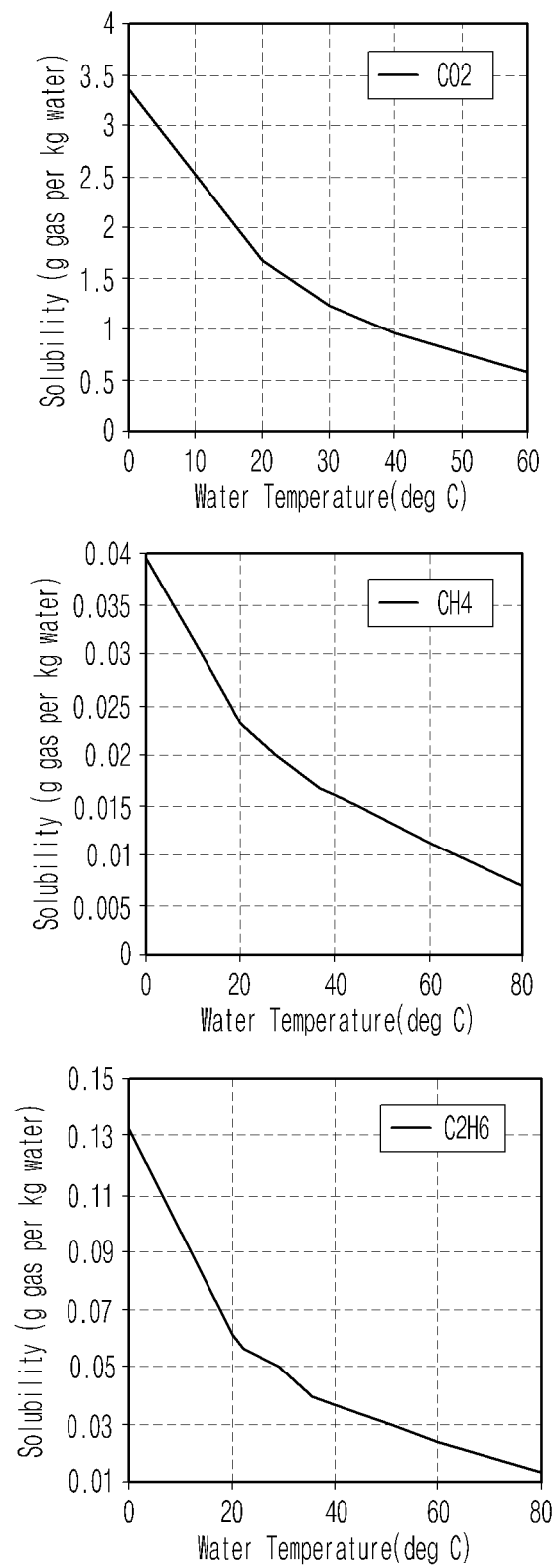
FIG. 2 is graphs illustrating solubilities of radiocarbons according to a temperature.

As illustrated in the solubility graphs of FIG. 2, it may be understood that the solubility may further increase as the temperature decreases, and thus, the dissolution of the radionuclide in step 3 may be performed in a state in which the temperature of the condensate recovery unit is decreased by the chiller. As a result, a gas phase radionuclide, such as the radiocarbon, may be more effectively dissolved in the condensate.

The method of separating and recovering a liquid waste including a radionuclide according to the present invention is a method of separating and recovering a liquid waste including a radionuclide by using the separation and recovery device as illustrated in FIG. 1, in which a liquid waste mixture including a radionuclide, such as tritium or radiocarbon, is heated, but the liquid waste mixture is heated to a temperature at which only a low boiling point liquid waste is evaporated. Since a high boiling point liquid waste and the low boiling point liquid waste are separated by the heating and the low boiling point liquid waste is condensed, the liquid waste mixture may be separated and recovered. The low boiling point liquid waste may be separated by the evaporation and condensation. However, since the radionuclide, such as radiocarbon, may be recovered by being dissolved in the condensed low boiling point liquid waste, the release of the radionuclide to the external environment may be prevented without a separate collection device or a separate treatment system.

In addition, in the separation and recovery method according to the present invention, since almost no radionuclide is included in the remaining high boiling point liquid waste that is not evaporated, the remaining high boiling point liquid waste may be recycled or may be treated as a non-radioactive waste. Furthermore, since oil is not included in the condensate having most of the radionuclide enriched therein, the condensate may be easily processed even in a wastewater treatment system of a nuclear power plant, in which wastewater including oil may not be processed.

Hereinafter, the present invention will be described in more detail according to examples. However, the following examples are provided for illustrative purposes only, and the scope of the present invention should not be limited thereto in any manner.

Example 1

Liquid waste mixtures including a radionuclide were separated by using a separation and recovery device as illustrated in FIG. 1.

In this case, compositions of simulated liquid waste mixtures, as the liquid waste mixtures, were prepared by mixing Regal 46, a lubricant used as engine oil for machinery in a nuclear power plant, and SC-1000, a detergent used in cleaning the lubricant, as listed in the following Table 1. In addition, a simulated liquid waste mixture including a fluorescent liquid waste, which has a composition listed in Table 1, was prepared so that the composition is the same as a composition of an actual fluorescent liquid waste.

2 L of the simulated liquid waste mixture prepared was introduced into a liquid waste storage unit, and the liquid waste storage unit was transferred to a heating unit by using a liquid waste storage unit transfer cylinder, i.e., a liquid waste storage unit transfer device.

Thereafter, the inside of a condensate recovery unit was decompressed to an absolute pressure of −0.2 MPa (absolute pressure of about 8/10 atm) by using a vacuum pump, and the state of vacuum was then maintained by closing a valve. Then, indirect heating was performed using heat medium oil to maintain a temperature of the inside of the heating unit in a range of 150° C. to 160° C., and thus, only the detergent and water, as a low boiling point liquid waste among the liquid waste mixture, were evaporated.

In this case, simultaneously with the heating, a refrigerant was circulated by using a chiller and thus, the liquid waste mixture was separated and recovered by appropriately maintaining a temperature of the condensate recovery unit in a range of 5° C. to 10° C. according to a type of the evaporated liquid wastes. The results of the separation and condensation are presented in Table 1 below.

As described in Table 1, pressures in the separation device were tended to be slightly increased from initially about 0.015 MPa to about 0.19 MPa until the separation of the liquid waste mixtures were completely terminated. However, it may be understood that a decompressed state that was sufficient for transferring the evaporated liquid waste may be maintained. In addition, it may be confirmed that separation efficiencies of all of the liquid waste mixtures were 99% or more when the operation is terminated.

Furthermore, as illustrated in Table 1, with respect to the fluorescent liquid waste, it may be understood that the time required for the separation and recovery process changed when the temperature of the heating unit was changed at the same composition. However, it may be understood that the separation efficiencies were always 99% or more even in the case in which the conditions of the operation were changed.

A separation and recovery device for a liquid waste including a radionuclide according to the present invention may prevent the release of a radionuclide to the environment by separating a liquid waste mixture including a radio nuclide, such as tritium or radiocarbon. In addition, since almost no volatile radionuclide, such as tritium or radiocarbon, is included in the remaining liquid waste having the radionuclide separated therefrom, the remaining liquid waste may be recycled or may be treated as a regulatory exempt waste. Furthermore, since an organic liquid waste, such as oil, is not included in a condensed liquid waste including most of tritium and radiocarbon, the condensed liquid waste may be easily processed even in a wastewater treatment system of a nuclear power plant, in which wastewater including oil may not be processed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of separating and recovering a liquid waste that includes a radionuclide by using a separation and recovery device, the method comprising:

TABLE 1

| Composition of liquid waste mixture | Internal temperature of heating unit (° C.) | Process time (min.) | Pressure changes in separation device (MPa) | Separation efficiency |
| --- | --- | --- | --- | --- |
| Waste oil(Regal46) 40 wt %/ Waste detergent(SC-1000) 60 wt % | 160 | 170 | 0.015 → 0.193 | >99% |
| Waste oil(Regal46) 30 wt %/ Waste detergent(SC-1000) 70 wt % | 160 | 195 | 0.015 → 0.191 | >99% |
| Waste oil(Regal46) 20 wt %/ Waste detergent(SC-1000) 80 wt % | 160 | 220 | 0.015 → 0.183 | >99% |
| Fluorescent liquid waste(LLT)91 wt %/water 9 wt % | 160 | 70 | 0.015 → 0.197 | >99% |
| | 150 | 95 | 0.015 → 0.195 | >99% | heating a liquid waste mixture to evaporate a low boiling point liquid waste that includes a radionuclide (step 1);
condensing the low boiling point liquid waste evaporated in step 1 and then recovering a condensate to a condensate recovery unit (step 2); and
dipping one end of a transfer tube in the condensate recovered in step 2 to dissolve the evaporated radionuclide in the condensate (step 3),
wherein the separation and recovery device comprises:
a liquid waste storage unit that stores the liquid waste mixture;
a heating unit that heats the liquid waste storage unit to such that the low boiling point liquid waste is evaporated from the liquid waste mixture;
a condensation chamber that is connected to an upper portion of the heating unit and that condensates the evaporated low boiling point liquid waste, wherein the condensation chamber is positioned at an incline relative to the liquid waste storage unit such that a horizontal axis of the condensation chamber is at an angle relative to a horizontal axis of the liquid waste storage unit, and wherein at least some of the evaporated low boiling point liquid waste is retained within the condensation chamber after being condensed;
the condensate recovery unit, wherein the condensate recovery unit is connected to the condensation chamber and is configured to recover the condensate; and
a transfer tube that transfers the condensate condensed in the condensation chamber to the condensate recovery unit, wherein one end of the transfer tube is dipped in the condensate in the condensate recovery unit,
wherein the evaporated low boiling point liquid waste moves from the heating unit to the condensate recovery unit by a pressure difference between the heating unit and the condensate recovery unit, and
wherein the evaporated radionuclide is recovered by being dissolved in the condensate in the condensate recovery unit.

2. The method as set forth in claim 1, wherein the heating of step 1 is performed at a temperature at which a high boiling point liquid waste is not evaporated but only the low boiling point liquid waste is evaporated.

3. The method as set forth in claim 1, wherein the radionuclide of step 1 is tritium (H-3) or radiocarbon (C-14).

4. The method as set forth in claim 1, wherein the liquid waste mixture is a waste detergent including waste oil or wastewater including a fluorescent liquid waste.

5. The method as set forth in claim 1, wherein the separation and recovery device further comprises a vacuum pump that is linked with the condensate recovery unit.

6. The method as set forth in claim 1, wherein the separation and recovery device further comprises a transfer device that transfers the liquid waste storage unit to the heating unit, and
the liquid waste storage unit and the heating unit are allowed to be spaced apart from each other.

7. The method as set forth in claim 1, wherein the heating unit is included in a form of surrounding the liquid waste storage unit and indirectly heats the liquid waste storage unit by using heat medium oil.

8. The method as set forth in claim 1, wherein the separation and recovery device further comprises thermocouples that respectively measure temperatures of the heating unit and the liquid waste storage unit.

9. The method as set forth in claim 1, wherein the separation and recovery device further comprises a chiller that cools the condensate recovery unit.

10. The method as set forth in claim 1, wherein the condensation chamber is a transparent container.

11. The method as set forth in claim 1, wherein the method further comprises:
prior to heating the liquid waste mixture, causing the liquid waste storage unit to be vertically raised such that the liquid waste storage unit enters a cavity of the heating unit, wherein the liquid waste storage unit was initially in a lowered position prior to being heated.

12. The method as set forth in claim 11, wherein the liquid waste storage unit is caused to be raised at least partially by an air compressor.

13. The method as set forth in claim 1, wherein the method further comprises:
maintaining a predetermined amount of condensate in the condensate recovery unit, whereby, when the one end of the transfer tube is dipped in the condensate in the condensate recovery unit, the one end of the transfer tube is continuously surrounded by condensate.

14. The method as set forth in claim 1, wherein the condensation chamber further comprises a first connection and a second connection, the first connection connecting the condensation chamber to the upper portion of the heating unit, the second connection connecting the condensation chamber to the transfer tube, and wherein the first connection and the second connection are asymmetrically positioned in relation to each other on the condensation chamber.

15. The method as set forth in claim 9, wherein a refrigerant of the chiller cools the condensate recovery unit.

* * * * *